United States Patent [19]
Bond

[11] Patent Number: 6,028,731
[45] Date of Patent: Feb. 22, 2000

[54] METHOD AND SYSTEM FOR PROVIDING SERVO SIGNALS TO A MAGNETIC HEAD POSITIONING SYSTEM OF DISK DRIVE

[76] Inventor: Charles R. Bond, 502 Sark Ct., Milpitas, Calif. 95035

[21] Appl. No.: 08/624,108

[22] Filed: Mar. 29, 1996

[51] Int. Cl.[7] ............................................... G11B 5/596
[52] U.S. Cl. .................................. 360/77.11; 360/78.14; 360/77.02; 360/78.04
[58] Field of Search ............................. 360/77.11, 78.14, 360/77.02, 78.04

[56] References Cited

U.S. PATENT DOCUMENTS

| | | | |
|---|---|---|---|
| 3,263,031 | 7/1966 | Welsh | 360/77.11 |
| 4,028,535 | 6/1977 | Franaszek et al. | 360/41 X |
| 4,286,296 | 8/1981 | Cunningham | 360/77.11 |
| 4,542,425 | 9/1985 | de Niet . | |
| 4,551,777 | 11/1985 | Saito et al. | 360/77.11 |

FOREIGN PATENT DOCUMENTS

| | | | |
|---|---|---|---|
| 63-98820 | 4/1988 | Japan | 360/77.11 |
| 63-113817 | 5/1988 | Japan | 360/77.11 |

OTHER PUBLICATIONS

Brian H. Marcus et al., "Finite–State Modulation Codes for Data Storage," IEEE Trans. Selected Areas of Commun., vol. 10,No. 1, Jan. 1992, pp. 5–37.
K.A. S. Immink, Coding Techniques for Digital Recorders, Englewood Cliffs, NJ: Prentice–Hall, 1991, pp. 247–263.
M. K. Haynes, "Magnetic Recording Techniques for Buried servos," IEEE Trans. Mag., vol. MAG–17, No. 6, Nov. 1981, pp. 2730–2734.
N. H. Hansen, "A Head Positioning System Using Buried Servos," IEEE Trans. Mag., vol. MAG–187,No. 6, Nov. 1981, pp. 2735–2738.
C. Menyennett, et al., "Sequences and a New Code with Spectral Nulls at Rational Submultiples of the Symbol Frequency," IEEE Trans. Mag. vol. 29, No. 6, Nov. 1993, pp. 4042–4044.
R. K. Oswald, "Track Following Servo Sytem," IBM Technical Disclosure Bulletin, vol. 18, No. 10, Mar. 1976, pp. 3424–3425.
W. A. Herrington, et al., "Quad–Burst PES System for Disk File Servo," IBM Technical Disclosure Bulletin, vol. 21, No. 2, Jul. 1978, p. 804.
D. H. Pennington, et al., "Digital Sector Servo System," IBM Technical Disclosure Bulletin, vol. 22, No. 6, Nov. 1979.
C. C. Liu, "Quad–Burst Servo Pattern, "Quad–Burst Servo Pattern, IBM Technical Disclosure Bulletin, vol. 22, No. 12, May 1980, pp. 5436–5438.
The Complete Handbook of Magnetic Recording by Firnn Jorgensen, pp. 173–177, 189, 245, Dec. 1988.

*Primary Examiner*—Alan Faber
*Attorney, Agent, or Firm*—Samuel A. Kassatly

[57] ABSTRACT

A method and system for developing continuous position control signals for continuously repositioning a data head relative to an addressed data track on a rotating magnetic disk. The method includes the steps of formatting the disk with a unique servo pattern to provide servo signals having servo frequencies F1 and F2, which correspond to spectral nulls in the frequency spectrum of the encoded data stored on the disks. The method further establishes addressable data track locations related to the servo pattern which have a nominal width corresponding to the width of one servo band of the pattern. After positioning the data head to a data track the method involves "side" reading with the data head the servo pattern that is adjacent both sides of the data track to develop the positional control signals as data encoded with spectral nulls at F1 and F2 is transferred to and from the disk. The system comprises a magnetic disk that has a prerecorded servo pattern to provide two position control signals at F1 and F2 which correspond to spectral nulls in the frequency spectrum of the encoded data that is stored on the disk and a plurality of addressable data tracks, the location of each being determined by the servo pattern. The system further includes an actuator for positioning a data head to a selected data track and circuit connected to the data head to develop position error signals from the F1 and F2 signals generated by the data head, "side" reading the pre- recorded servo pattern.

16 Claims, 6 Drawing Sheets

METHOD AND SYSTEM FOR PROVIDING SERVO SIGNALS TO A MAGNETIC HEAD POSITIONING SYSTEM OF DISK DRIVE

FIELD OF INVENTION

This invention relates to track following servo systems for disk drives having one or more magnetic disks for storing information on concentric recording tracks, and in particular to an improved method and system for providing servo signals to the servo control circuits of a magnetic head positioning system.

BACKGROUND OF THE INVENTION

The prior art discloses various types of disk files that are employed to store data in information handling systems. A disk file comprises generally one or more disks each having a magnetic surface for storing data. The disks are mounted on a spindle and continually rotated at a constant speed. A magnetic transducer is mounted on a head arm assembly which cooperates with the magnetic surface of the disk and is movable by an actuator to preselected concentric recording tracks under the control of an address signal supplied to the actuator from the data processing system. The transducer is lightly biased toward the disk surface and is spaced therefrom by a film of air as the disk is rotated. This type head is sometimes referred to in the art as an air bearing type head. The transducer is supplied with data signals during the data storage operation. During reading of stored data the transducer senses the magnetic transitions which are converted to data for use by the system.

Disk file configurations vary in the number of disks employed, the size of the disks, and the type of actuators that are employed to position the magnetic head to an addressed recording track. Since total storage capacity of a disk file has, in recent years, become an important parameter, most file configurations employ a plurality of disks mounted on a common spindle, with each disc surface having a separate magnetic transducer associated with it.

Two general types of electromagnetic actuators have been used for positioning the magnetic heads. In one type of actuator, the heads are moved during the track accessing operation in a straight line which generally follows a radial line through the center of the spindle. The second type of actuator is referred to as a rotary actuator. This type actuator moves the head during the track accessing operation on an arc substantially normal to the tracks. In both actuator types, the individually manufactured head-arm assemblies that are associated with each disk surface must be assembled into a comb type structure with the transducers at the distal ends of the head arms accurately aligned vertically.

The personal computer and in particular the so called "lap top" models of personal computers, have imposed a size parameter on disk files which is in total opposition to the currently desired capacity requirements for data storage. Stated differently, as the need for more storage capacity is increasing, the size requirements for disk storage drives is decreasing.

Disk diameter is the dominating factor in determining the foot print of the drive. The number of disks in the stack generally determines the height of the drive. In the last few years disk diameters for fixed disk drives used in personal computers have decreased from five and one-quarter inches to three and one-half, to one and one-eighth inches. Prototype disk files employing one inch disks are discussed currently in the literature. The decrease in size has had little or no impact on storage capacity, in that the various technologies which directly affect capacity, such as linear recording density and track density, have been substantially improved.

In recent years substantial increases in track density have been made as a result of improvements in magnetic head technology, the recording channel circuits, and the magnetic head positioning systems. Substantially all state of the art disk drives have head positioning systems which employ a servo control system supplied with servo signals developed from reading prerecorded servo data from the disk, to maintain the transducer precisely over the center of the addressed track.

A technique called "sector-servoing" is currently employed in many drives to develop the servo control signals. The concept of sector servoing involves formatting each of the concentric tracks on the disk in alternate sectors of servo data and regular data. The sections of tracks in the sectors containing servo data have a pre-recorded servo pattern which can produce a correction signal that is supplied to the servo system to continuously reposition the head to the center of the track only as the head is scanning the servo sector. No corrective action on the position of the head relative to a track can be achieved when the head is scanning a data sector and data is being transferred to or from the system.

It will be seen that the sector servoing technique always requires a compromise to achieve the optimum percentage of track used for servo data. The designer can improve the positioning accuracy of the positioning system, and hence increase track density by using more of the recording track for servo data. However, using more of the track for servo data reduces the data capacity of the track.

Another technique that has been suggested in the art is referred to as a "buried servo" technique. This technique requires a special two layer disk in which the bottom layer is a high coercively pre-recorded servo layer and the upper layer is a lower coercivity data recording layer. The servo data is recorded under high field conditions so that normal data recording at lower field levels does not affect the previously recorded servo data. In use the servo data is filtered out of the read channel signal and supplied to the positioning system.

While the buried servo technique can supply servo signals concurrently with recording and reading of data, it has not been readily accepted in that the cost of applying the two layers of magnetic material having different coercivities has proved to be uneconomical.

Another arrangement that has been used in disk files having a relatively large number of stacked disks involves the concept of dedicating one disk surface for servo tracks and the remaining disk surfaces to data. If the disk stack has for example 50 disk surfaces and only one is used for servo data, the percentage of disk space devoted to the servo function is only slightly more than two percent. However, as the number of disks in a stack decreases, the percentage increases. Since, track densities and linear recording densities have increased so dramatically in recent years, the need for disk stacks heaving a large number of disks has evaporated.

The present invention provides a method and system in which servo signals are developed from a single layer magnetic surface on which data tracks are defined by a servo pattern that has been pre-recorded on the same single magnetic layer used for storing data and can be recovered by the same transducer.

SUMMARY OF THE INVENTION

In accordance with the present invention, a method and system are provided for use with a disk drive data storage apparatus in which data signals are provided from a read head reading data stored on a selected one of a plurality of concentric recording tracks of a magnetic disk. Concurrently with the reading of data, servo control signals are also sensed by the transducer by "side" reading of an edge strip of a prerecorded servo pattern on each side of the selected data track. The track width of an initial pre-recorded servo track pattern is wider than the effective width of the written data track. As a result the transducer is capable of "side" reading the edges to provide servo control signals when data is being transferred to and from the disk.

The pre-recorded servo signals are selected to produce a pair of known servo frequencies (a first frequency F1 and a second frequency F2). The process of encoding the data has been similarly selected to produce a pair of nulls at these knows frequencies F1 and F2. The servo signals at the two known frequencies F1 and F2 are filtered from the data signals and are used to precisely reposition the head relative to the track during both the read and write operations.

The method involves pre-recording with the data and/or servo transducer a plurality of concentric servo tracks, wherein the recording results in a plurality of alternating servo tracks at frequencies F1 and F2. The alternating servo tracks may be separated from each other by an unrecorded space, such that when the alternating servo tracks comprising the servo information are overwritten with data, the centerline of the data recording in track width direction coincides with the centerline between two adjacent servo tracks recorded at frequencies F1 and F2, a resultant residual portion of the servo tracks remains on each side of the data track and provides the final servo information tracks that will be sensed by the side reading capability of the transducer, while the transducer transfers data to and from the disk (FIG. 2).

The method further involves encoding the write data by a technique which creates a spectral null at frequencies F1 and F2. The servo pattern and the encoding technique are coordinated so that the frequencies F1 and F2 produced by reading the servo pattern on opposite sides of the data track correspond to the spectral nulls incorporated into the write data stored on the track. Since the data track is narrower than the pair of servo tracks prerecorded at the servo frequencies F1 and F2, each data track is bounded by alternate servo tracks with servo patterns which produce two continuous servo control signals having the two different frequencies F1 and F2. The servo signal provided from the magnetic head as it scans the data track is filtered and equalized at the two different servo tracks at frequencies F1 and F2 to continuously provide the servo signals to the servo control circuits of the head positioning system. The positioning system in response to the relative amplitudes of the filtered and equalized servo signals continuously repositions the head to the center of the data track being scanned.

The system comprises a magnetic disk having a plurality of concentric recording tracks, each of which is selectable by a head positioning system of a disk drive data storage apparatus. The disk has a plurality of concentric servo tracks with a servo pattern in which alternate spaced servo tracks are recorded at frequencies F1 and F2 respectively, and in which each servo track may have a width that is approximately equal to that of the data track to be recorded. Data tracks are recorded such that the centerline of each data track is disposed coincident with the centerline of the common space between a pair of adjacent servo tracks. After the data tracks are recorded, a portion of the servo track on each side of the data track remains available for "side" reading by the read/write pole of the magnetic head during transfers of data to and from the disk.

Data is stored on the disk in data tracks which are centered on the common space between adjacent prerecorded servo tracks. The width of the data track is narrower than the prerecorded pair of servo tracks, so that the common space between the side portions of the two adjacent servo tracks which were over written are still readable by the transducer as it scans the selected data track.

The system includes an encoder that encodes data to be stored on the disk so that there are nulls at predetermined frequencies F1 and F2 in the data write signal and the data read signal. Circuitry connected between the magnetic head and the positioning system functions to process signals provided by the head. The head provides servo signals during data transfer operations by "side" reading the pre-recorded side portions of the servo patterns on each side of the selected track. The servo components of the read signal at the two known frequencies F1 and F2 are filtered out and equalized, and provided to the positioning system. Concurrently, read data is being supplied to the read channel for processing.

A similar operation occurs as the write data signal is supplied to the magnetic head since the magnetic head can still provide position error signals by "side" reading of the servo patterns. The magnetic head is thus maintained in precise registration with the selected track during the data read and write operations since the "side" reading ability of the magnetic head continuously supplies servo control signals to the head positioning system.

It is therefore an object of the present invention to provide a method and system for use in a disk drive data storage apparatus in which servo control signals are generated concurrently by the magnetic transducer during data read and write operations.

Another object of the present invention is to provide an improved magnetic head positioning system for a disk drive in which head position control signals are developed concurrently with read and write signals.

A further object of the present invention is to provide a method to develop continuous position control signals for use in a disk drive positioning system, concurrently with the reading and writing of data on said disk drive.

Still a further object of the present invention is to employ the "side" reading ability of a conventional magnetic transducer of a disk drive to provide a continuous control signal to the transducer positioning system.

Briefly, the above and further objects and advantages of the present invention will become apparent from the following description of a preferred embodiment of the invention when read in connection with the drawing.

BRIEF DESCRIPTION OF THE DRAWING

Similar numerals refer to similar elements in the drawing. It should be understood that the sizes of the different components in the figures are not necessarily to scale or in exact proportion, and are shown for visual clarity and for the purpose of explanation.

DETAILED DESCRIPTION OF THE PREFERRED EMBODIMENT

Figure 1:
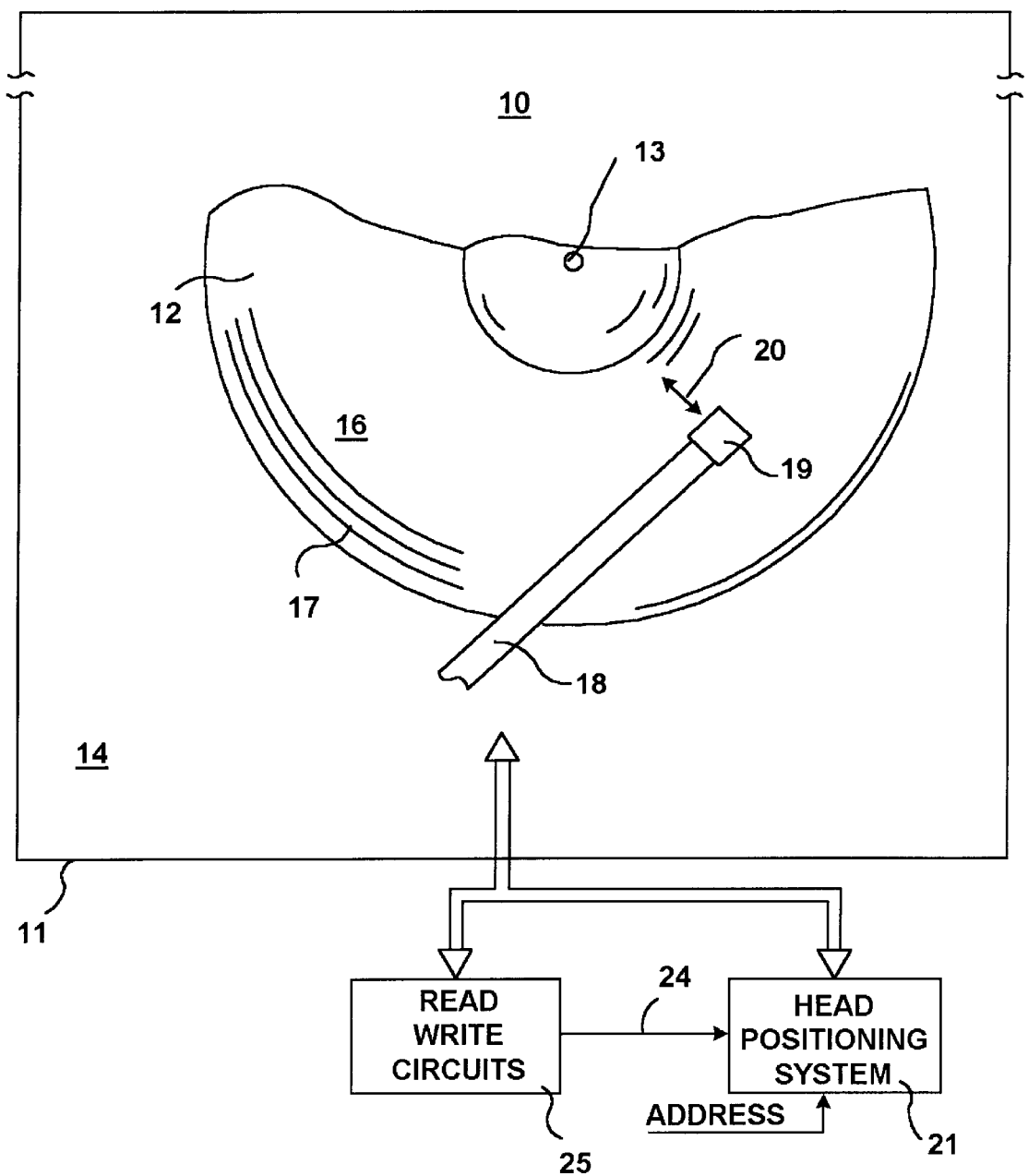
FIG. 1 is a partial schematic plan view of a storage system, such as a disk drive, in which the present invention may be readily employed.

FIG. 1 is a schematic plan view of a disk drive 10 showing the location of the various functional parts. The disk drive 10 generally includes a base plate 11 on which is mounted a plurality of magnetic disks 12 which rotate about an axis 13 that is normal to the surface 14 of the base plate 1 1. The disks 12 are normally rotated at a constant speed during the transfer of data to and from the disks 12 by means of a motor (not shown) that may be positioned under the base plate. The disk surface 16 has a relatively large number of closely spaced concentric recording tracks 17.

The drive 10 as shown includes a rotary type electromagnetic actuator 18 for positioning the magnetic heads 19 relative to the placement of recording tracks defined by tracks 17 on each of the recording surfaces of disks 12. Magnetic heads 19 are moved in an arc 20 across the surface 16 of disk 12 during a track accessing operation under the control of a head or servo positioning system represented functionally by block 21.

Positioning system 21 comprises two separate functions. The first function is to provide control signals to the actuator 18, in order to position the magnetic heads 12 to a selected track 17, in response to a binary address signal obtained from a data processing system (not shown). The second function is to continuously reposition the magnetic head relative to the center of the data track by developing track following servo position control signals 24 which are supplied to the electromagnetic actuator 18 during transfer of data signals to and from the magnetic disk.

FIG. 1 also includes a functional block 25 representing the read/write channel or circuits of the disk drive 10. Block 25 includes the circuits involved in transferring binary data signals to and from the data processing system. The read and write windings of the magnetic heads 19 are connected to block 25 which includes a special filter and equalizer 26 (FIG. 4), the function and operation of which are described later in the specification.

FIGS. 2A and 2B illustrate a portion of the magnetic disk 12 showing the relative layout of the servo tracks and the data tracks. In FIG. 2A, sections of three concentric pre-recorded servo tracks are illustrated and designated ST1, ST2 and ST3. As shown ST1 and ST3 are recorded with an F1 frequency signal while F2 is recorded with an F2 frequency signal. The servo tracks are shown spaced apart radially. In one embodiment, adjacent servo tracks, such as ST1 and ST2, may be physically separated by a spacing "d". In another embodiment, adjacent servo tracks may be recorded so that the adjacent edges of a pair of tracks, such as ST1 and ST2, are contiguous.

Figure 2:
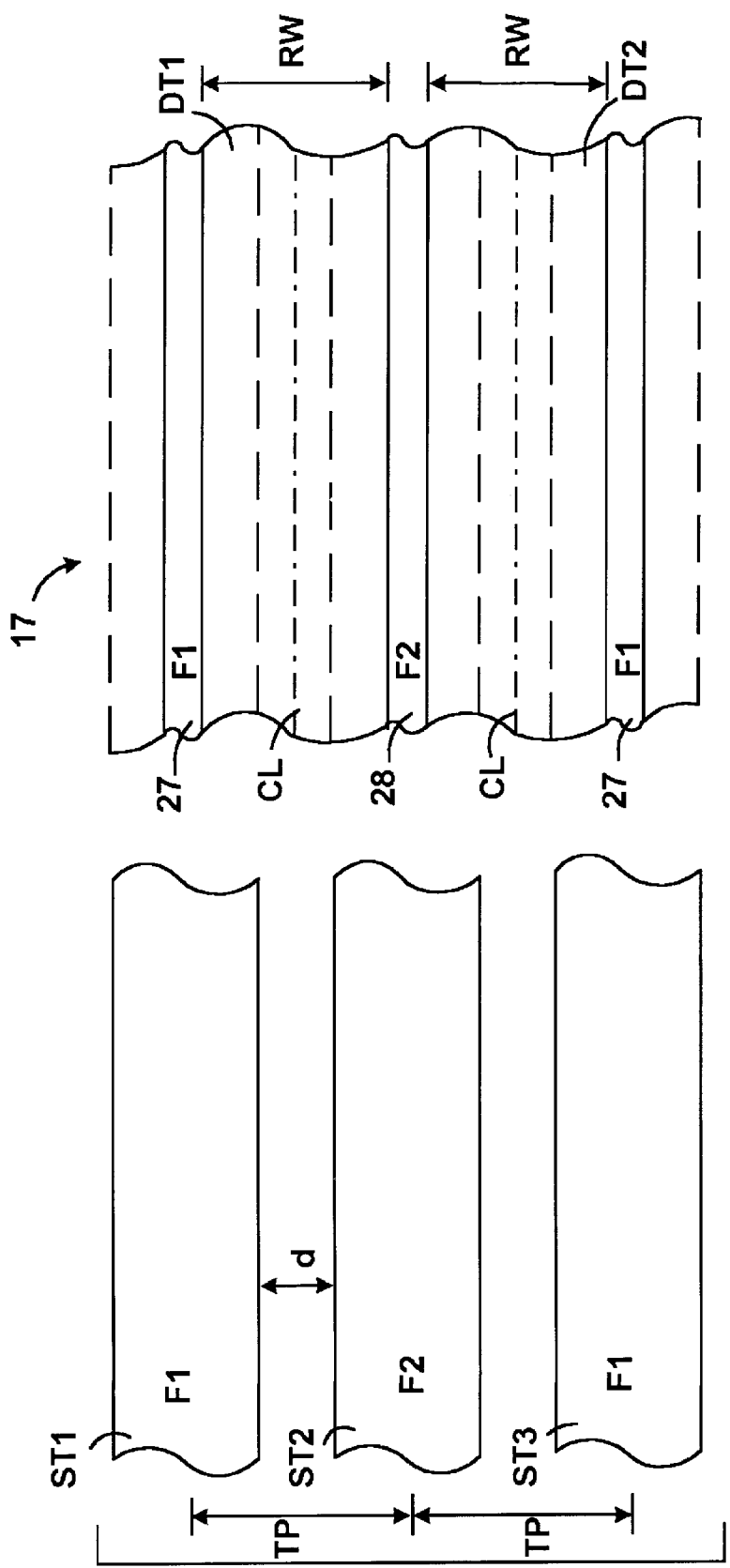
FIGS. 2A and 2B are greatly enlarged views of a section of a magnetic disk forming part of the disk drive storage system of FIG. 1, illustrating prerecorded servo tracks, data tracks and side portions of the pre-recorded servo tracks which remain after data is recorded.

In FIG. 2B the data tracks are designated as DT1 and DT2 and are disposed with their respective center lines CL coincident with the centerline of the space between adjacent pre-recorded servo tracks. While the track pitch of the data tracks is the same as the track pitch of the servo tracks, the effective recorded width (RW) of the data track is less than the distance (TP) between centerlines of adjacent data tracks. As a result, adjacent data tracks are separated by a narrow strip, i.e., 27, 28 of the prerecorded servo tracks. For example, data track DT1 in FIG. 2 is bounded on one side by strip 27 which was recorded initially when servo track ST1 was recorded with the F1 frequency signal. Data track DT1 is bounded on the other side by strip 28 which was recorded initially when servo track ST2 was recorded with the F2 frequency signal.

Figure 3:
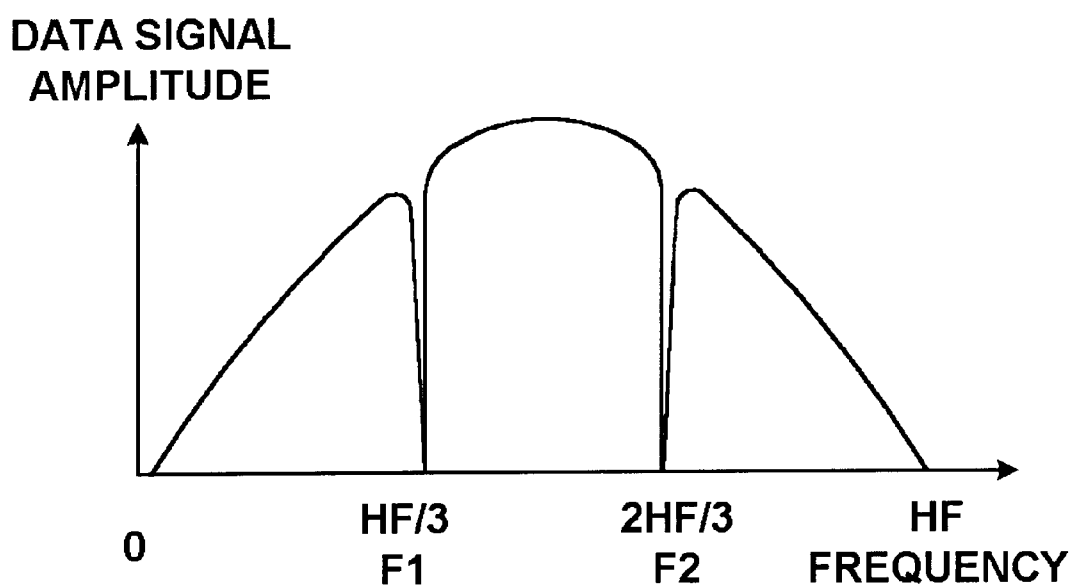
FIG. 3 illustrates the frequency response spectrum of a Partial Response Code that employs two null points at frequencies F1 and F2.

FIG. 3 illustrates the desired spectrum of the data read or write signal. As shown, the spectrum has a pair of null points which correspond to the frequencies F1 and F2 of the signals produced by the magnetic head "side" reading the unerased portions of the servo pattern. The design of data encoding schemes which provide spectral nulls is described extensively in the prior art and hence is not repeated here. The following reference describes one such exemplary code, and is incorporated herein by reference "Finite State Modulation Codes for Data Storage", B. H. Marcus et al. IEEE Trans. Selected areas of Commun., Vol. 10, No.1, Jan. 1992.

It should be understood that any encoding scheme which produces two or more spectral nulls in the frequency range which correspond to the nulls in the servo pattern may be employed. It should however be understood that any two distinct frequencies may be selected as the servo frequencies F1 and F2.

In one embodiment, it is possible to allocate the two servo frequencies so that F1 is at one-third of the highest data frequency and F2 is at two thirds of the highest frequency using a trellis encoding technique to create spectral nulls in the data signal spectrum at these frequencies. It is also possible to place F1 and F2 at the low end of the data spectrum so as to exploit the low frequency sensitivity of "side" reading by the magnetic head.

The above described arrangement can be used to reduce the demands on the mechanical stability of the drive spindle/electromechanical actuator since servo position signals are continuously supplied to the actuator during all data transfers to and from the disk. Alternately, current performance levels can be achieved at lower cost.

While a preferred embodiment has been described in relation to two null frequencies F1 and F2 in the data spectrum, it should be understood any two spectral null frequencies in the data may be selected, such as the harmonics or rational sub-multiples of the servo frequencies F1 and F2. In other terms any spectral null at the rational sub-multiples of the bit rate may be used. For instance, any null at every multiple of the lowest null, up to the frequency corresponding to the bit rate may be used, since [(1/n)×bit rate] will be accompanied by nulls at [(2/n), ×bit rate], [(3/n)×bit rate], . . . , [(n/n)×bit rate]. It should be noted that not only the spectra of the data and the servo frequencies (or tones) F1 and F2 are well separated from each other, but they are also separated from the spectra of the rational sub-multiples of the servo frequencies F1 and F2. As a result, the signal to noise ratio of the head 19 is optimized.

The spectral null codes, also referred to as trellis codes, are well-adapted for use in the present invention because they permit the signal spectrum to be separated from the servo spectrum. Thus, simultaneous operation of the servo and data recovery systems can be done with minimal interaction or interference between the servo and data recovery systems. However, the spectral null codes may not be necessary for the successful operation of "side-reading" the servo tracks 27, 28 (or 154, 155 in FIG. 6). For instance, any two appropriately selected frequencies may be used as alternative to, or in conjunction with the servo frequencies F1, F2 or their rational sub-multiples or harmonics.

Figure 4:
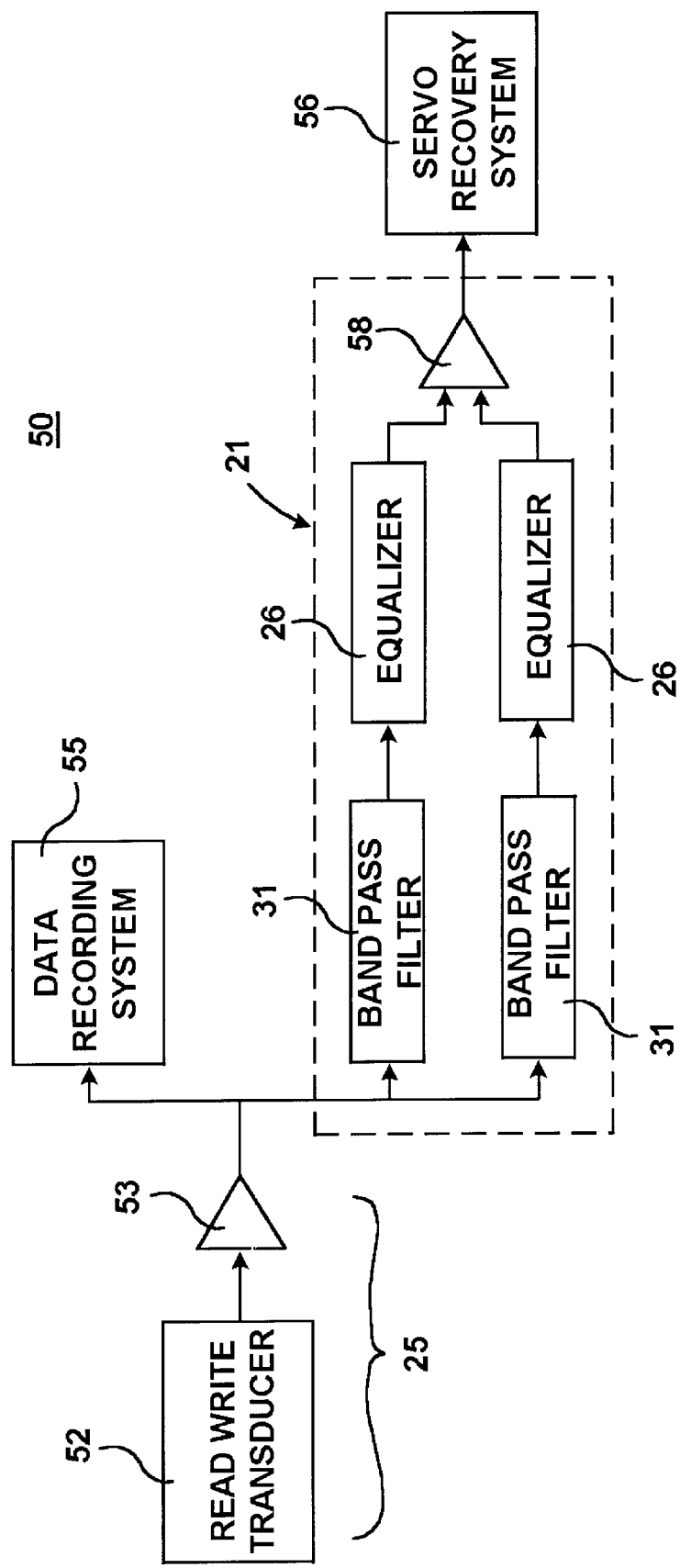
FIG. 4 is a simplified high level schematic diagram of a signal and data processing system according to the present invention, for use in the storage system of FIG. 1.

With reference to FIG. 4, it is a high level schematic diagram of a signal and data processing system 50 according to the present invention, for use in the storage system 10 of FIG. 1. Block 25 (FIG. 1), which represents the read/write channel or circuits is partly illustrated in FIG. 4 by a read/write transducer 52 and a preamplifier 53. The read/write transducer 52 forms part of the magnetic head 19, and reads data from and/or writes data onto the disk 16. The output of the read/write transducer 52 is fed into the preamplifier 53, whose output is split between the servo positioning system 21 and a data recording system 55.

The data recording system 55 converts the signals to the original data sequence. The servo positioning system 21 generates error signals that are proportional to the off-track misposition of the read/write transducer 52 relative to the track 17. The servo positioning system 21 provides the difference signal which is fed to a servo recovery system 56 that drives the actuator 18, for repositioning the read/write transducer 52 to a desirable ontrack position.

Referring more specifically to the servo positioning system 21, it includes one band-pass filter 31 and one equalizer 26 for each servo frequency F1, F2. For purpose of illustration only, the upper band pass filter 31 and equalizer 26 form a first servo path corresponding to the servo frequency F1, and the lower band pass filter 31 and equalizer 26 form a second servo path corresponding to the servo frequency F2. The function of these servo paths is to filter out the servo signals at the servo frequencies F1, F2, that are indicative of the position of the read/write transducer 52 relative to the track 17, by restricting the frequency spectrum to the band of interest. The filter 31 may be an active, passive or tracking filter. The magnitude of the filtered signal is generally small compared to the amplitude of the data signal, and represents the servo signal that is "side read" by the transducer 52. The "side read" signals have so far been typically considered as noise or nuisance factor to be eliminated. However, according to the present invention, these "side read" signals are considered by the servo positioning system 21 as useful servo signal that are equalized by the equalizers 26, and then amplified by an error amplifier 58.

The amplified error at the output of the error amplifier 58 is indicative of the position of the read/write transducer 52 relative to the track 17. Thus, for example, if the amplitude of the signal at the servo frequency F1 is greater than that at the servo frequency F2, the servo positioning system 21 recognizes the difference in amplitude as an error, and instructs the servo recovery system 56 to compensate for this error by repositioning the read write transducer 52 relative to the track 17.

In general, the servo control information is recovered by supplying the read signal to special equalized, filter circuits shown by functional block 31 to recover the position error signals generated by "side" reading the portions of the servo pattern remaining on each side of the data track. When the amplitude of one signal is greater than the amplitude of the other signal, a positional error signal 24 is developed by these circuits which causes the actuator 18 to reposition the head relative to the center of the data track.

The direction of movement to correct an off center position depends, for example, on the track address and which signal F1 or F2 has the greatest amplitude. If signal F1 is larger than signal F2 the direction of movement for adjacent tracks will be different since the pattern that generates signal F1 is between two adjacent tracks. In practice the width of the remaining servo tracks 27, 28, may extend beyond the erase width of the head to account for positional tolerances allowed for in the positioning system. This would ensure that a sufficient or residual servo track would always remain recorded on the disk and would not be erased by the data head.

While only two servo paths are shown, it should be understood that other servo paths may alternatively be defined and used as part of the servo positioning system 21.

Figure 5:
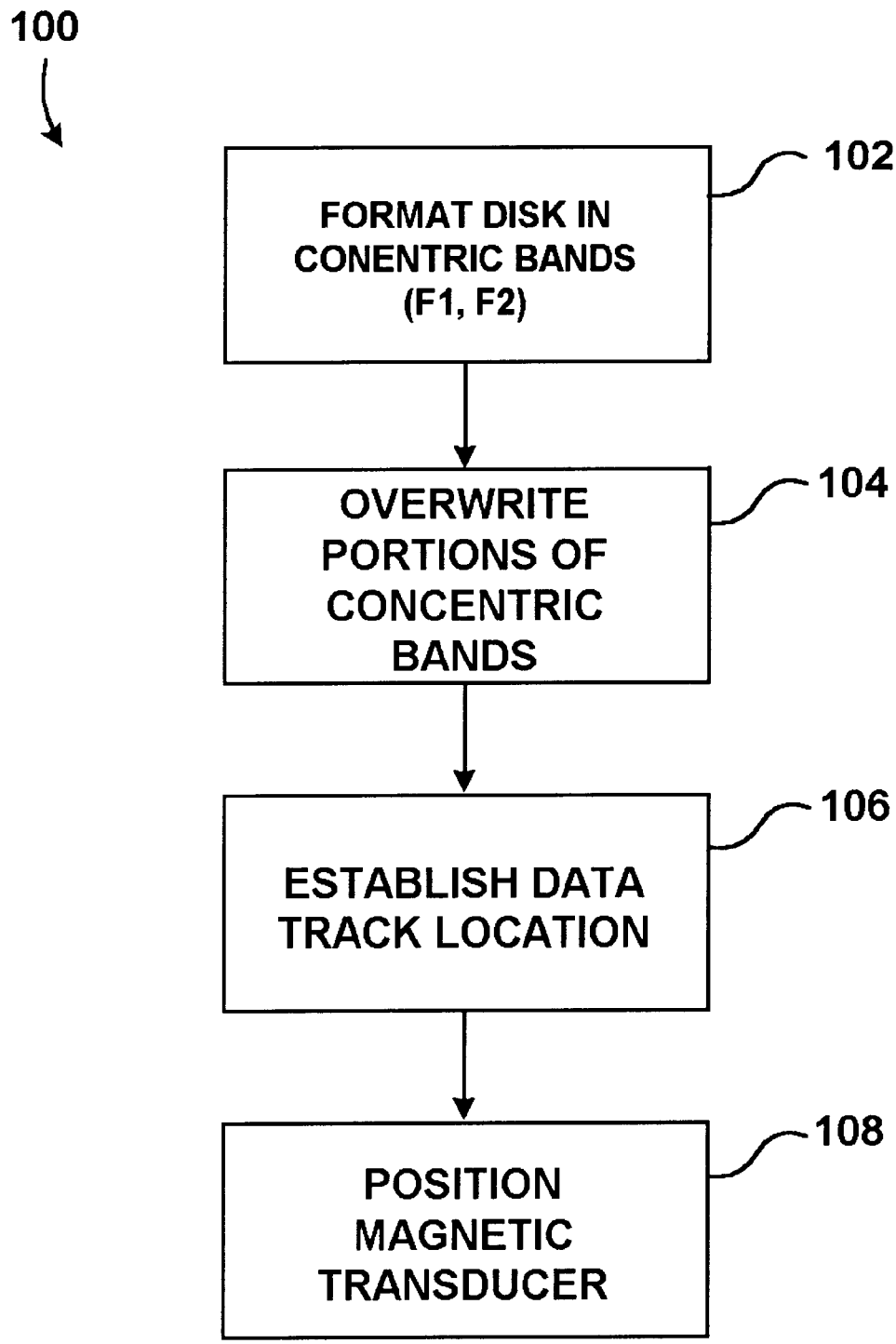
FIG. 5 is a flow chart setting forth the steps of a method for providing continuous servo signals to a magnetic head positioning system forming part of the disk drive storage system of FIG. 1.

FIG. 5 is a flow chart setting forth the major steps of the method 100 of providing continuous servo signals to the magnetic head positioning system of the disk drive 10, according to the present invention. The method 100 includes the step 102 of formatting a disk 12 with a servo pattern comprising first and second sets of interleaved concentric bands or servo tracks, i.e., ST1, ST2 and ST3. Successive pairs of these servo tracks are adapted to provide signals having different predetermined frequencies, i.e., F1 and F2.

At step 104, equal portions of each servo track are erased or overwritten on either side of the respective center lines CL coincident with the centerline of the space between adjacent pre-recorded servo tracks, i.e., ST1 and ST2, such that these equal portions are determined by the reading and writing characteristics of the magnetic head 19 which is to be continuously repositioned by a position control system during data transfers to and from the disk 12. At step 106, an addressable data track location is established. At step 108, the magnetic transducer is positioned to a selected data track location in response to an address signal supplied to the head positioning system.

In this method 100, the process of creating the servo tracks generally includes the steps of:
1. Recording signals at alternating frequencies F1 and F2 on concentric tracks in those areas where data will ultimately be stored.
2. Identifying the relative track locations of adjacent originally written servo tracks. The spacing between servo tracks is equal to the track pitch.

An exemplary basic process of formatting the disk 12 is as follows:
1. Locate the data head such that its center is midway between two successive servo tracks.
2. Establish the data tracks by recording suitable signals in the data tracks. This signal recording operation will overwrite and thus erase portions of the previously recorded and alternating servo bands or tracks recorded with F1 and F2 servo frequencies, and will leave residual servo signals at the servo frequencies F1 and F2 between data tracks. These residual servo tracks 27, 28 are ultimately read by side reading capability of the servo-data read write transducer.

While reading recorded data tracks, the read write transducer by virtue of its inherent side reading capability senses the signals from the residual servo tracks 27, 28, and, if the transducer is positioned exactly on the data track, the signals from the residual servo tracks 27, 28 are equal for equalized amplitudes at the servo frequencies F1 and F2.

Figure 6:
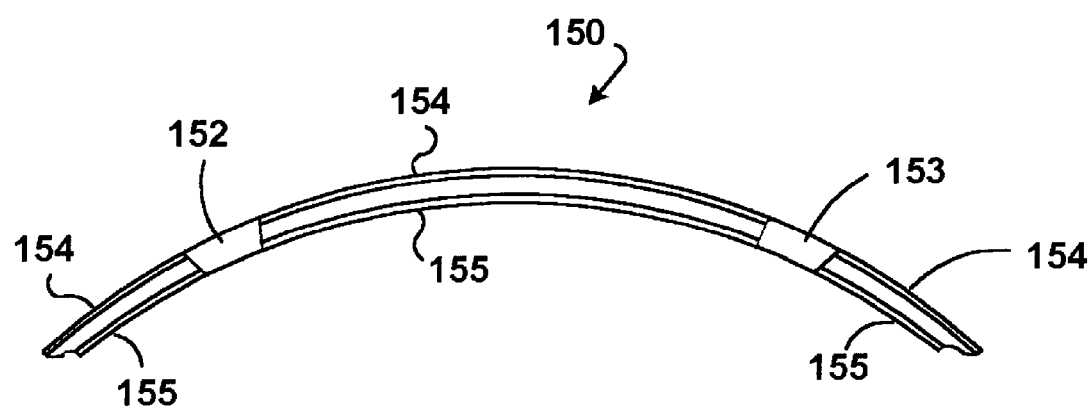
FIG. 6 is an enlarged, partial, top plan view of one track with two side servo tracks according to the present invention.

FIG. 6 illustrates another track embodiment 150 according to the present invention. The track 150 is formed similarly to the track 17 described above in relation to FIGS. 1 through 5, with the exception that the track 150 one or more servo sectors 152, 153 that are distally separated, and radially disposed relative to the track 150. The track 17 also includes two side servo tracks 154 and 155 that are generally similar to the servo tracks 27 and 28 (FIG. 2B), respectively. In one embodiment, the servo tracks 154, 155 form continuous concentric rings, while in another embodiment, the servo tracks are intermittent, and extend between two adjacent servo sectors, i.e., 152, 153. In this latter embodiment, the servo tracks 152, 153 may optionally be used to provide coarse positioning information of the transducer 52 relative to the track 150, while the servo tracks 152, 153 may provide accurate or "fine" positioning information.

It will be apparent from reading the above description of the preferred embodiment of the invention that various modifications may to made to both the described method and system without departing from the spirit of the invention and the scope of the following claims.

It will be apparent that many of the advantages of the present invention can also be obtained in a sampled data servo type system employing disk sectors dedicated solely to servo data. In such a hybrid system the size of the servo sector as well as the number of such sectors can be considerably reduced thereby increasing storage efficiency.

It should also be apparent that the method and system is not limited to the described servo pattern comprising alternate servo tracks of F1 and F2 signals. Any servo pattern used in sampled servo data systems may be modified to provide an F1 and F2 positional control signal in the data sector, and thereby provide a continuous servo positional control between samples.

What is claimed is:

1. A method for positioning a magnetic head relative to a data track disposed on a magnetic medium which stores data that has a signal spectrum having at least two nulls at frequencies F1 and F2, the method comprising: formatting said media with a servo pattern that provides position error signals at frequencies F1 and F2; and "side" reading said servo pattern with said head continuously to generate position error signals which reposition said head while said head is transferring data to and from said track.

2. The method recited in claim 1 wherein said medium is a magnetic disk and said step of formatting includes:

recording first and second sets of interleaved concentric bands, successive pairs of which are adapted to provide signals having frequencies F1 and F2; and overwriting an equal portion of each band on either side of the common boundary between adjacent bands to define a center line of a data track.

3. The method recited in claim 2 further including establishing an addressable data track location at each of said common boundary of each successive pair of said concentric bands, the nominal width of said data track corresponding substantially to the width of one of said bands.

4. The method recited in claim 3 further including positioning said magnetic transducer to a selected data track location in response to an address signal supplied to said head positioning system.

5. The method recited in claim 4 further including "side" reading with said magnetic head, portions of said servo track in the bands adjacent said data track to provide continuous position control signals to said head positioning system during the transfer of data to and from said addressed track.

6. A system for repositioning a magnetic head relative to a data track which stores data, the system comprising:

a servo pattern formatted on a disk for providing position error signals; and a transducer for "side" reading said servo pattern with said head generating position error signals which reposition the head while the head is transferring data to and from said track.

7. The system recited in claim 6 wherein said servo pattern includes:

a plurality of generally concentric bands, successive pairs of which provide signals having servo frequencies F1 and F2.

8. The system recited in claim 7 further including a data track, wherein the width of said data track corresponds substantially to the width of one of said bands.

9. The system recited in claim 8, wherein said transducer is positioned to a selected data track in response to an address signal supplied to the head.

10. The system recited in claim 9 further comprising a circuit for providing position control signals during the transfer of data to and from said data track by "side" reading portions of said servo pattern in bands adjacent said data track.

11. The system recited in claim 6 wherein said servo pattern includes a plurality of pairs of continuous sectors of servo tracks containing servo information at predetermined servo frequencies.

12. An apparatus for positioning a head relative to a data track on a data storage medium, comprising:

a transducer for recovering servo tracking signals from a servo pattern formed on the data storage medium by side reading said servo tracking signals in order to position the head over the data track;

wherein said transducer recovers servo tracking signals that include signals at two predetermined servo frequencies; and wherein said servo frequencies are null frequencies in the data spectrum or rational sub-multiples of said null frequencies.

13. A positioning system for providing servo control signals to position a head over a data track in a data storage medium in which a servo pattern is formed, comprising:

a control device for continuously repositioning the head relative to the data track by processing track following servo position control signals generated during transfer of data signals to and from the data storage medium by side reading the servo pattern; and wherein the servo pattern contains two servo frequencies that are null frequencies in a data spectrum or rational sub-multiples of said null frequencies.

14. A method of manufacturing a data storage medium comprising:

recording a plurality of interleaved concentric bands, successive pairs of which are adapted to provide signals having predetermined frequencies F1 and F2, said frequencies F1 and F2 representing two null frequencies at rational sub-multiples of a high frequency and located within a data spectrum; and overwriting a portion of at least some of said bands on either side of a common boundary between adjacent bands to define a center line of a data track.

15. A method as in claim 14, further including establishing a data track location at said common boundary.

16. A data storage medium comprising:

a plurality of recorded interleaved concentric bands, successive pairs of which are adapted to provide signals having predetermined frequencies F1 and F2, said frequencies F1 and F2 representing two null frequencies at rational sub-multiples of a high frequency and located within a data spectrum; and a portion of at least some of said bands are overwritten on either side of a common boundary between adjacent bands to define a center line of a data track.

* * * * *